(12) United States Patent
Senti et al.

(10) Patent No.: US 12,370,013 B2
(45) Date of Patent: Jul. 29, 2025

(54) FASTENING SYSTEM FOR A DENTAL OBJECT

(71) Applicant: Ivoclar Vivadent AG, Schaan (LI)

(72) Inventors: Theresa Sujata Maria Senti, Triesenberg (LI); Frank Müller, Feldkirch (AT); Andreas Schülke, Grabs (CH); Alexander Grosse-Honebrink, Arbon (CH)

(73) Assignee: Ivoclar Vivadent AG, Schaan (LI)

( * ) Notice: Subject to any disclaimer, the term of this patent is extended or adjusted under 35 U.S.C. 154(b) by 42 days.

(21) Appl. No.: 17/541,615

(22) Filed: Dec. 3, 2021

(65) Prior Publication Data

US 2022/0183790 A1    Jun. 16, 2022

(30) Foreign Application Priority Data

Dec. 16, 2020 (EP) .................................... 20214681

(51) Int. Cl.
*A61C 5/80* (2017.01)

(52) U.S. Cl.
CPC ...................................... *A61C 5/80* (2017.02)

(58) Field of Classification Search
CPC ................ A61C 5/80; A61C 5/85; A61C 5/88
USPC ........................................................ 433/141
See application file for complete search history.

(56) References Cited

U.S. PATENT DOCUMENTS

| | | | | |
|---|---|---|---|---|
| 4,202,328 A | 5/1980 | Sukkarie | | |
| 4,259,070 A * | 3/1981 | Soelberg | ................... | A61C 5/88 433/149 |
| 4,318,694 A * | 3/1982 | Klein | ........................ | A61C 7/12 433/18 |
| 4,578,035 A * | 3/1986 | Pruitt | ........................ | A61C 5/88 433/149 |
| 4,813,869 A | 3/1989 | Gatewood | | |
| 5,573,400 A * | 11/1996 | Asher | ........................ | A61C 5/88 433/136 |
| 6,086,365 A | 7/2000 | Fields | | |
| 6,257,884 B1 * | 7/2001 | Chang | ..................... | A61C 5/007 433/18 |
| 7,118,376 B2 | 10/2006 | Jodaikin et al. | | |
| 7,354,270 B2 | 4/2008 | Abolfathi et al. | | |
| 8,226,412 B1 * | 7/2012 | Slone | ........................ | A61C 5/88 433/215 |
| 8,662,889 B2 | 3/2014 | Baker | | |
| 8,770,970 B2 * | 7/2014 | Haikel | .................... | A61C 5/007 433/18 |
| 9,545,332 B2 | 1/2017 | Luco | | |
| 10,070,944 B2 | 9/2018 | Singer et al. | | |
| 11,000,324 B1 | 5/2021 | Marcus | | |
| 2003/0186186 A1 * | 10/2003 | Hahn | ........................ | A61C 5/85 433/149 |

(Continued)

FOREIGN PATENT DOCUMENTS

DE 102018132984 A1 6/2020
JP S56-132946 A 10/1981

*Primary Examiner* — Matthew M Nelson
(74) *Attorney, Agent, or Firm* — Ann M. Knab; Thad McMurray (57) ABSTRACT

The present invention relates to an fastening system (100) for a dental object, comprising a transverse connector (101) for passing through an interdental space (103); and a support member (105) for supporting the transverse connector (101) against the teeth (107-1, 107-2) laterally of the interdental space (103).

9 Claims, 8 Drawing Sheets

(56) References Cited

U.S. PATENT DOCUMENTS

| | | | |
|---|---|---|---|
| 2005/0089813 A1* | 4/2005 | Slone | A61C 5/85 |
| | | | 433/39 |
| 2008/0026344 A1 | 1/2008 | Uji | |
| 2008/0113315 A1* | 5/2008 | Beggs | A61C 5/88 |
| | | | 433/148 |
| 2009/0029324 A1* | 1/2009 | Clark | A61C 5/88 |
| | | | 433/226 |
| 2009/0104581 A1* | 4/2009 | Simon | A61C 5/85 |
| | | | 433/149 |
| 2009/0208901 A1* | 8/2009 | Doenges | A61C 5/85 |
| | | | 433/155 |
| 2009/0286200 A1* | 11/2009 | Ho | A61C 5/88 |
| | | | 433/148 |
| 2012/0045734 A1* | 2/2012 | Thai | A61C 5/88 |
| | | | 433/149 |
| 2013/0149665 A1* | 6/2013 | Dragan | A61C 5/88 |
| | | | 427/2.14 |
| 2021/0282650 A1 | 9/2021 | Yoshida et al. | |
| 2021/0315460 A1 | 10/2021 | Hazama et al. | |
| 2021/0346690 A1 | 11/2021 | Demarest et al. | |
| 2021/0353180 A1 | 11/2021 | Fischer et al. | |

* cited by examiner

FASTENING SYSTEM FOR A DENTAL OBJECT

CROSS-REFERENCE TO RELATED APPLICATIONS

This application claims priority to European Patent Application No. 20214681.7 filed on Dec. 16, 2020, the disclosure of which is incorporated herein by reference in its entirety.

TECHNICAL FIELD

The present invention relates to a dental object fastening system and a method for fastening a dental object.

BACKGROUND

Today's intraoral fastening options are mechanically realized by clamps or chemically by adhesion. Known clamping methods include, for example, clamps that are placed around one or more teeth, dental aligners that encompass all or part of the dental arch, or bands that are placed around one or more teeth. Adhesion of foreign bodies is achieved by means of adhesives or cement. Another reversible option for attachment is the use of adhesive cream.

U.S. Pat. Nos. 11,000,324, 10,070,944, 9,545,332, 8,770,970, 8,662,889, 7,354,270 6,257,884, 6,086,365, 4,318,694 and 4,202,328 are directed to fixation devices for the oral cavity and are hereby incorporated by reference in their entirety.

SUMMARY

It is therefore the technical object of the present invention to provide a fastening system for a dental object that can be fastened easily and quickly. Examples of dental objects include, but are not limited to, a sensor, an electronic component, and/or a battery. For example, the dental object comprises electronics and a transmitter, such as NFC circuitry, or Bluetooth. This provides, for example, the technical advantage that data can be obtained and processed by the dental object. US 20080026344, 20210353180, 20210346690, 20210315460, and 20210282650 are directed to sensors for use in the oral cavity and are hereby incorporated by reference in their entirety.

This object is solved by objects according to the independent claims. Technically advantageous embodiments are the subject of the dependent claims, the description, and the drawings.

According to a first aspect, the technical problem is solved by a fastening system for a dental object, comprising a transverse connector for passing through an interdental space; and a support element for supporting the transverse connector on the teeth laterally of the interdental space. The fastening system enables intraoral attachment of a dental object without damaging the tooth structure. In addition, the attachment is easily reversible. With the help of the fastening system, dental objects can be fixed securely, temporarily, but also permanently.

In a technically advantageous embodiment of the fastening system, the cross connector has a sawtooth profile or a thread for screwing on a nut. This has the technical advantage, for example, that the transverse connector can be coupled to the support element at different lengths.

In a further technically advantageous embodiment of the fastening system, the support element has a latching means for engaging in the sawtooth profile of the cross-connector. A further support element can be firmly connected to the cross-connector. This has, for example, the technical advantage that the support element can be fastened variably and quickly to the cross connector.

In a further technically advantageous embodiment of the fastening system, a rotary joint is arranged between the cross connector and the support element. This has, for example, the technical advantage that the transverse connector and the support element are captively connected to each other.

In a further technically advantageous embodiment of the fastening system, the support element has a wedge shape. This has the technical advantage, for example, of improving a clamping effect on the tooth.

In a further technically advantageous embodiment of the fastening system, the transverse connector is tenso-elastic and/or the transverse connector is band-shaped or pin-shaped. This has the technical advantage, for example, that a force can be continuously applied to the support element and the transverse connector can be guided well through the tooth space.

In a further technically advantageous embodiment of the fastening system, the transverse connector and/or the support element is porous. This has, for example, the technical advantage that saliva flow is only slightly restricted and can be directed to a dental sensor.

In a further technically advantageous embodiment of the fastening system, the transverse connector, the dental sensor and/or the sensor housing comprise one or more channels. This has, for example, the technical advantage that a saliva flow is only slightly restricted and can be directed to a dental sensor.

In a further technically advantageous embodiment of the fastening system, the transverse connector comprises a further support element for support on the teeth. This has, for example, the technical advantage of providing a flexible fastening option.

In a further technically advantageous embodiment of the fastening system, the transverse connector and/or the support element comprises a plug-in mechanism for plugging on the dental object. The plug-in mechanism can be formed by a protruding connecting means. This provides, for example, the technical advantage that different dental objects can be attached to the fastening system.

In a further technically advantageous embodiment of the fastening system, the support element comprises an opening for the transverse connector to pass through. This provides, for example, the technical advantage of achieving a rapid connection between the individual support element and the cross-connector.

In a further technically advantageous embodiment of the fastening system, the transverse connector comprises a circumferential support edge for support on an opening edge. This has, for example, the technical advantage that the transverse connector can be fixed firmly and securely at a designated point on the support element.

In a further technically advantageous embodiment of the fastening system, the transverse connector comprises a conical section for inserting the support edge into the opening. This has, for example, the technical advantage of simplifying insertion and fastening to the groove.

In a further technically advantageous embodiment of the fastening system, the transverse connector comprises a threading section for threading the transverse connector into the opening. This provides, for example, the technical advantage of facilitating assembly of the fastening system.

In a further technically advantageous embodiment of the fastening system, the support element is elastic in such a way that it moves into the interdental space as a result of a pull of the cross-connector. This has the technical advantage, for example, that greater adhesion of the fastening system is achieved.

According to a second aspect, the technical problem is solved by a method for fastening a dental object, comprising the steps of passing a transverse connector through an interdental space; and supporting the transverse connector by a supporting element for supporting against the teeth laterally of the interdental space. Thereby, the same technical advantages are solved as by the fastening system according to the first aspect.

It is preferred that the fastening system herein does not require chemical adhesive or clamps for fastening objects to a tooth or teeth.

BRIEF DESCRIPTION OF THE DRAWINGS

Examples of embodiments of the invention are shown in the drawings and are described in more detail below.

It show.

DETAILED DESCRIPTION

Figure 1:
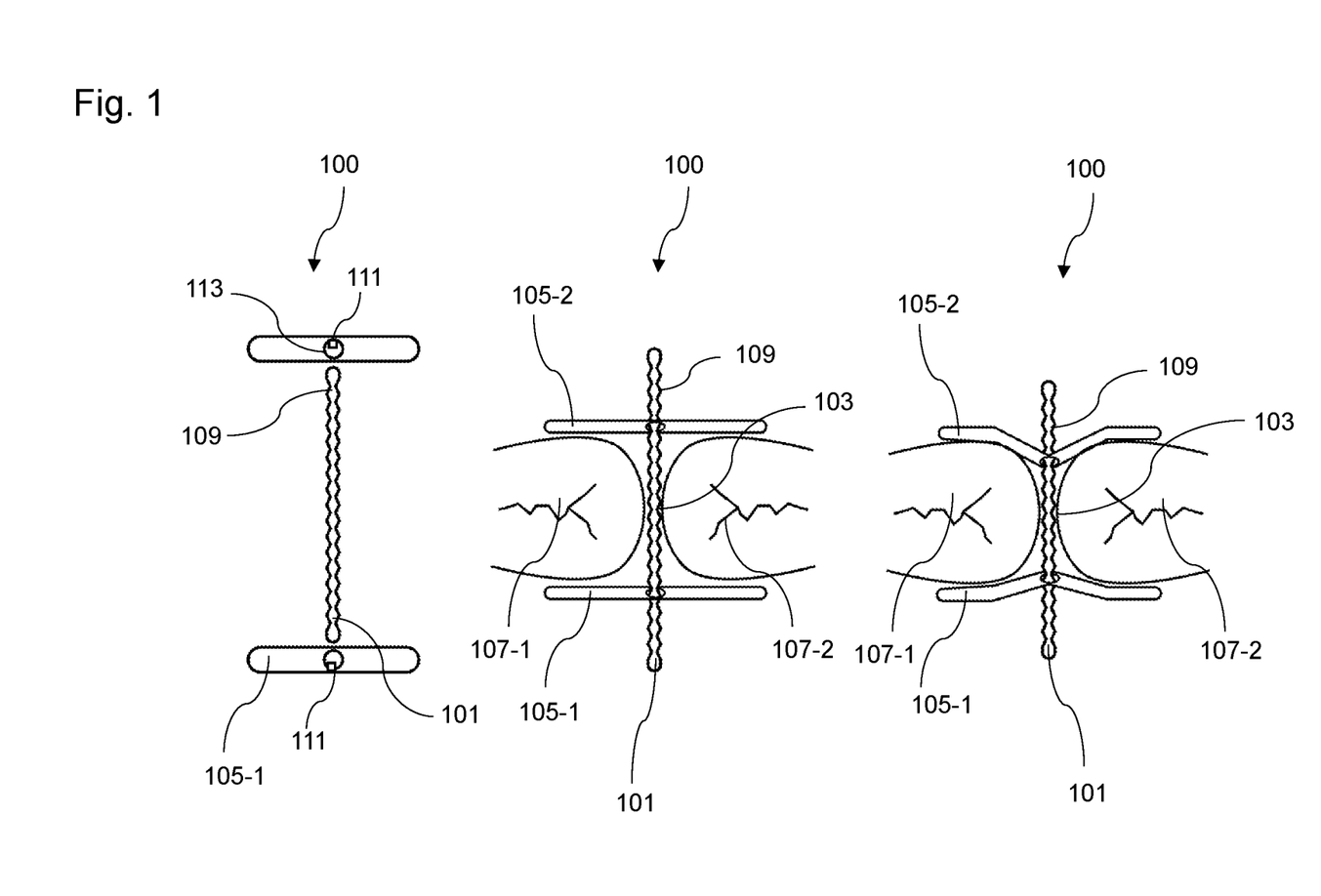
FIG. 1 a schematic view of a fastening system for a dental object.

FIG. 1 shows a schematic view of a fastening system 100 for a dental object. The fastening system 100 comprises a transverse connector 101 for passing through an interdental space 103 and two support elements 105-1 and 105-2 for supporting the transverse connector 101 on the teeth 107-1, 107-2 laterally of the interdental space 103.

Plates are used as support elements 105, which serve lingually and palatally as a safeguard on the opposite side of teeth 107-1 and 107-2. A connection between the inner and outer plates is made interdentally in an interdental space 103 with a round pin made of plastic or silicone as a transverse connector 101. The transverse connector 101 exerts a pull on the two support elements 105-1 and 105-2 so that the fastening system is held against the teeth 107-1 and 107-2. The cross connector 101 and the support elements 105-1 and 105-2 may be formed from corresponding plastic parts, for example.

The pin-shaped cross connector 101 has a sawtooth profile 109 in the longitudinal direction. The cross connector 101 is drawn through holes of defined diameter in the support elements 105, which are located interdentally and have a latching means 111 for engaging the sawtooth profile 109 of the cross connector 101. The latching means 111 may be disposed in an opening 113 into which the cross connector 101 is inserted.

In this way, a latching mechanism similar to that of a cable tie is realized, with which fastening system 100 can be quickly and securely fastened by tightening. Any protruding material of the cross connector 101 is cut off or ground. The fastening system 100 ensures a secure hold of a sensor housing.

However, the pin-shaped cross connector 101 may include a thread for threading on a nut instead of a sawtooth profile 109. In this case, the support element 105 can be attached to the cross connector 101 or a dental object by means of a nut. The cross connector 101 is threaded through the opening 113 in the support element 105-1 or 105-2, and then fixed in place by a nut that is threaded onto the thread.

Figure 2:
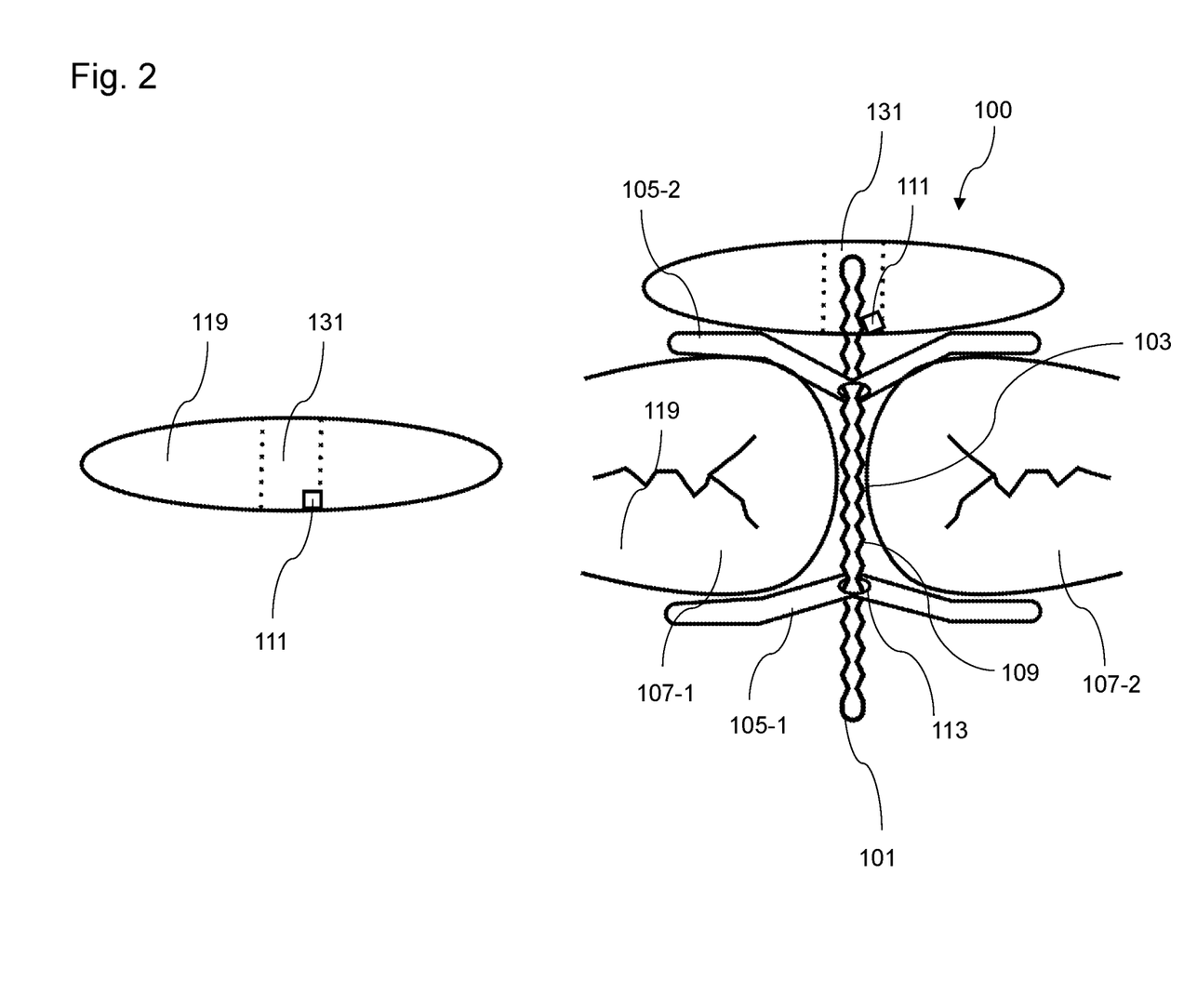
FIG. 2 a schematic view of the mounting system for a dental object in connection with a dental sensor.

FIG. 2 shows a schematic view of the mounting system 100 for a dental sensor 119 as a dental object. The dental object is any spatial object to be placed in an oral space (intraoral space). The fastening system 100 comprises two soft and elastic support elements 105-1 and 105-2, which comprise an opening 113 in the center with the latching means 111. In this way, an attachable latching system in the manner of a cable tie can be realized, in which the transverse connector 101 represents a cable tie without a head.

The support elements 105-1 and 105-2 are elastic in such a way that this can be moved into the tooth space 103 by the pull of the transverse connector 101. This creates a clamping effect that improves the fixation of the fastening system 100.

For example, the dental sensor 119 includes a housing that is adapted to a carrier with light-curable splint material. This allows the housing to be adapted precisely to the physiology of the wearer in a short time. The housing can be adapted to the respective oral situation on the basis of acquired scan data.

The dental sensor 119 includes a channel 131 with a latching means 111 for engaging the sawtooth profile 109 of the transverse connector 101. When the dental sensor 119 with the channel 131 is pushed onto the protruding transverse connector 101, it automatically latches onto the sawtooth profile 109 of the transverse connector 101. The precise fixation of the dental sensor 119 also enables it to be worn overnight.

The fastening system 100 forms a means of attaching the dental sensor 119 to the teeth with housing and electronics in the mouth. The housing can be printed from splint material.

Figure 3:
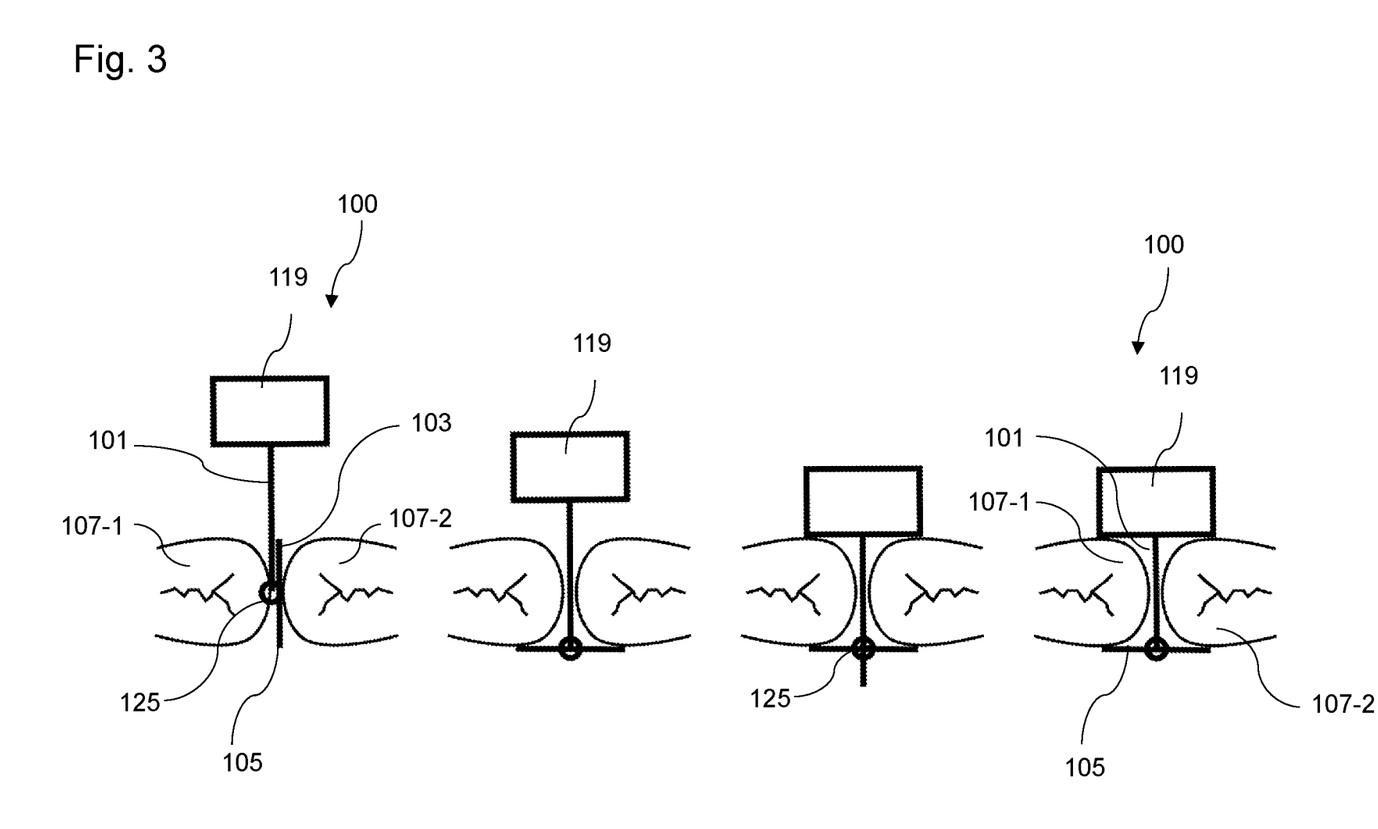
FIG. 3 a schematic view of another mounting system for a dental object in connection with a dental sensor.

FIG. 3 shows a schematic view of a further fastening system 100 for a dental object in connection with a dental sensor 119. The cross connector 101, which is formed by a silicone pin, will be attached to the teeth 107-1 and 107-2 by means of a catch device. For this purpose, a movable support element 105 is attached to the transverse connector 101 by means of one of a rotary joint 125, which can be rotated by 90 degrees. In this position, the fastening system 100 can be pushed through the tooth space 103. The rotary connection 125 between the cross connector 101 and the support element 105 can be implemented by means of a ring arranged on the cross connector 101 or the support element 105.

The support element 105 is then folded out to the T position so that the cross connector 101 can be supported on the teeth 107-1 and 107-2. This holds the sensor 119 against the tooth. Here, it may also be provided that the dental sensor 119 is attached in advance to a latching means on the cross connector 101 and can be removed again non-destructively.

In this case, the transverse connector 101 may be tensoelastic so that when a pull is exerted, the transverse connector 101 elongates such that the pivotally mounted support element 105 can be folded down. However, the transverse connector 101 may also have a length that additionally includes half the length of the support element 105 so that the pivotal connection mechanism can operate and the support element 105 can be folded down. Any excess length after folding down can be eliminated by means of a displaceable latching means 111 that is arranged in the dental sensor 119 or the rotary connection 125. For this purpose, the cross connector 101 with the sawtooth profile 109 may be fixedly attached to one side of a surface of the dental sensor 119.

Figure 4:
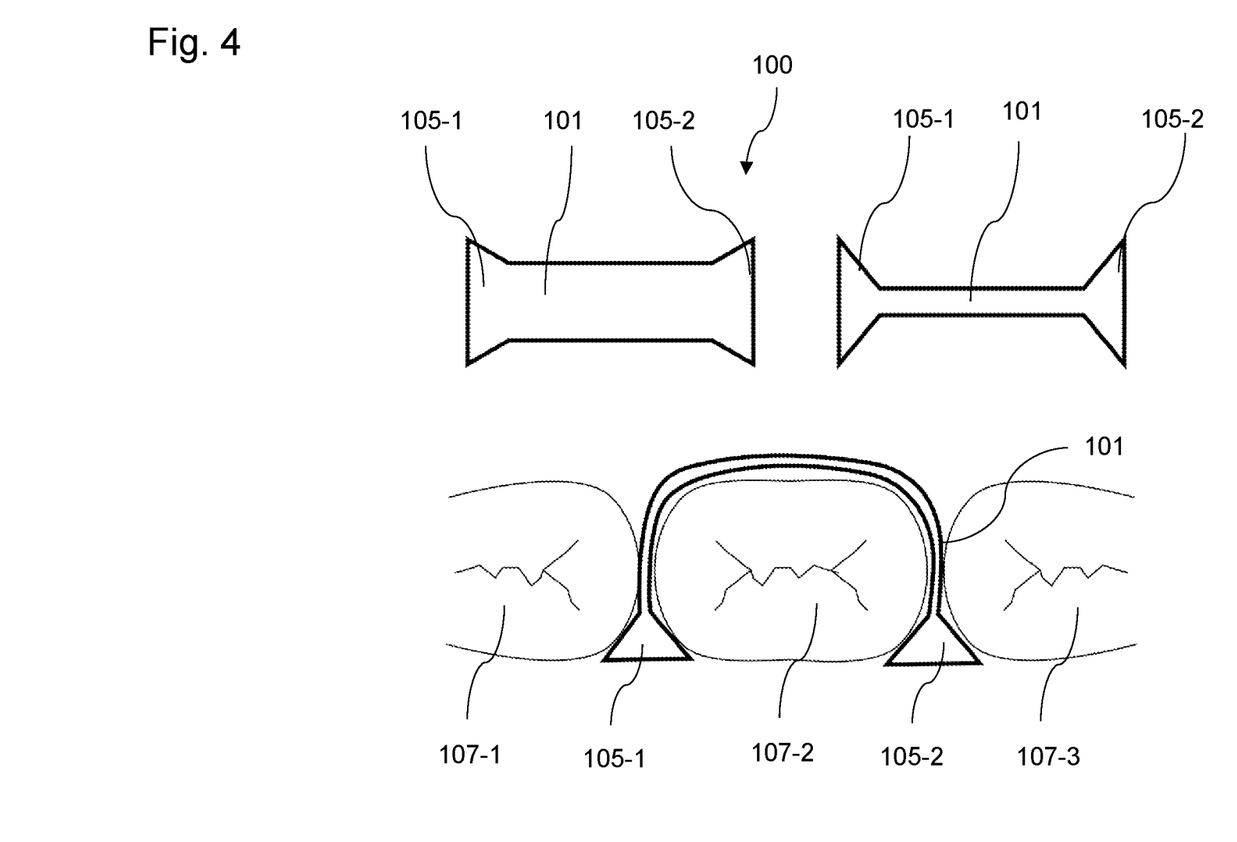
FIG. 4 a schematic view of a further fastening system for a dental object.

FIG. 4 shows a schematic view of another fastening system 100 for a dental object. In this embodiment, the transverse connector 101 is formed by an elastic band that is placed in the interdental space 103.

Two elastic wedges are formed on the elastic band as supporting elements 105-1 and 105-2. The support elements 105-1 and 105-2 are formed integrally with the cross connector 101. The first wedge is placed between two teeth 107-1 and 107-2, the band is placed around tooth 107-2 and fixed with the second wedge between teeth 107-2 and 107-3. The tension of the elastic band and the wedges fixes the fastening system 100 in place. In addition, a rough surface may be provided to provide additional adhesion to tooth 107-2.

Figure 5:
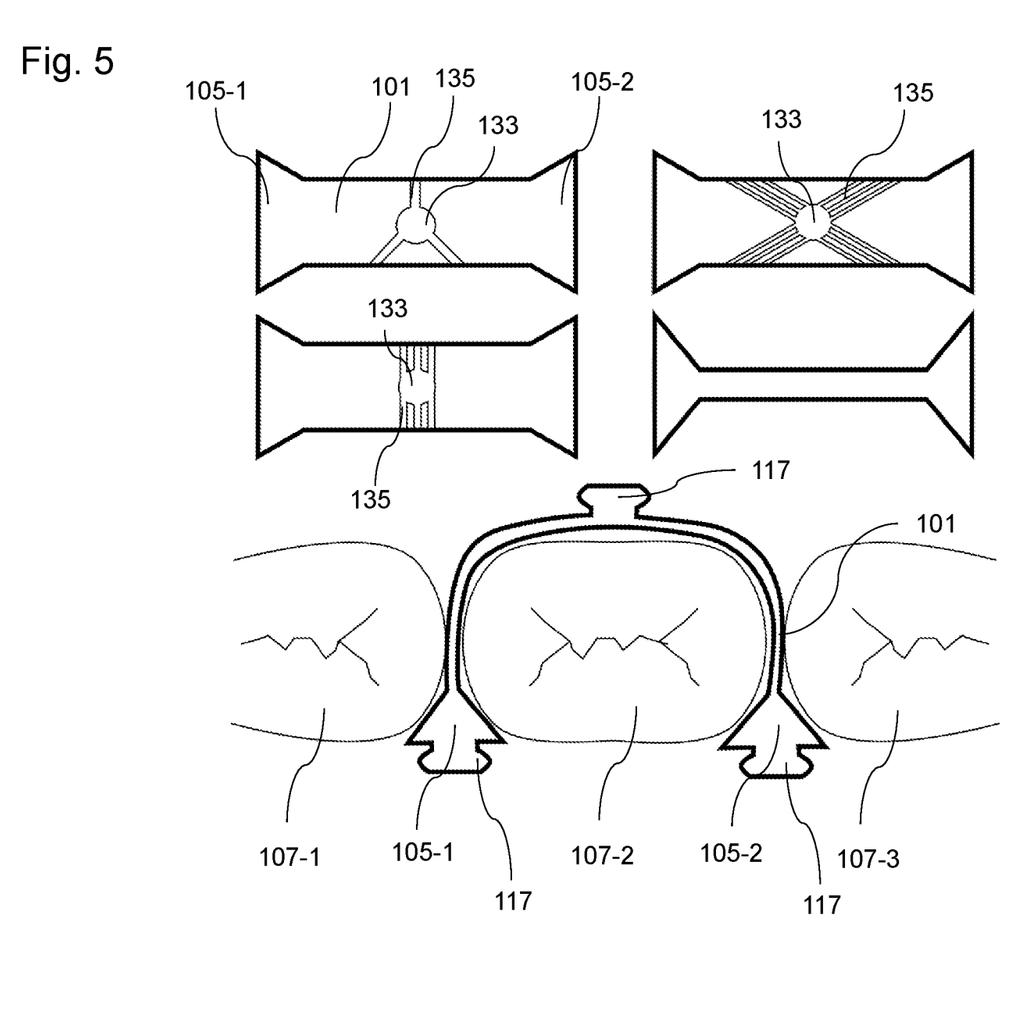
FIG. 5 a schematic view of a further fastening system for a dental object with through-holes.

FIG. 5 shows a schematic view of another dental object fastening system 100 having a through hole 133 and channels 135. The through hole 133 is located in the cross connector 101 and allows a dental sensor 119 to take measurements indirectly on the tooth 107.

In order to ventilate the through-opening 133 and remove liquid such as saliva, channels 135 are provided in the surface of the cross-connector, which are implemented by corresponding V-shaped or U-shaped recesses in the cross-connector. The channels 135 may extend horizontally, diagonally, or vertically. The channels 135 may also be provided in the dental sensor and/or the dental sensor housing.

For example, a vertical channel 135 may be provided to enter the through hole 133 from one side and supply air. Two diagonal channels 135 direct fluid out of the passageway opening 133 laterally to the other side. However, a plurality of channels 135 may also be parallel and enter the passage opening 133 from one side and exit the passage opening 133 from another side. In addition, a plurality of channels 135 may also be arranged in parallel and diagonally so that they cross each other in the region of the passage opening 133.

In addition, the cross connector 101 and the two support elements 105-1 and 105-2 comprise a plug-in mechanism 117 onto which the dental object or the dental sensor 119 can be plugged. The plug-in mechanism 117 is integrally formed on the cross connector 101 and/or the two support elements 105-1 and 105-2 in the form of a protruding connecting means. A latching function can be realized by the plug-in mechanism 117. thereby, multiple sensor units can be attached to the plug-in mechanisms 117 simultaneously.

Figure 6:
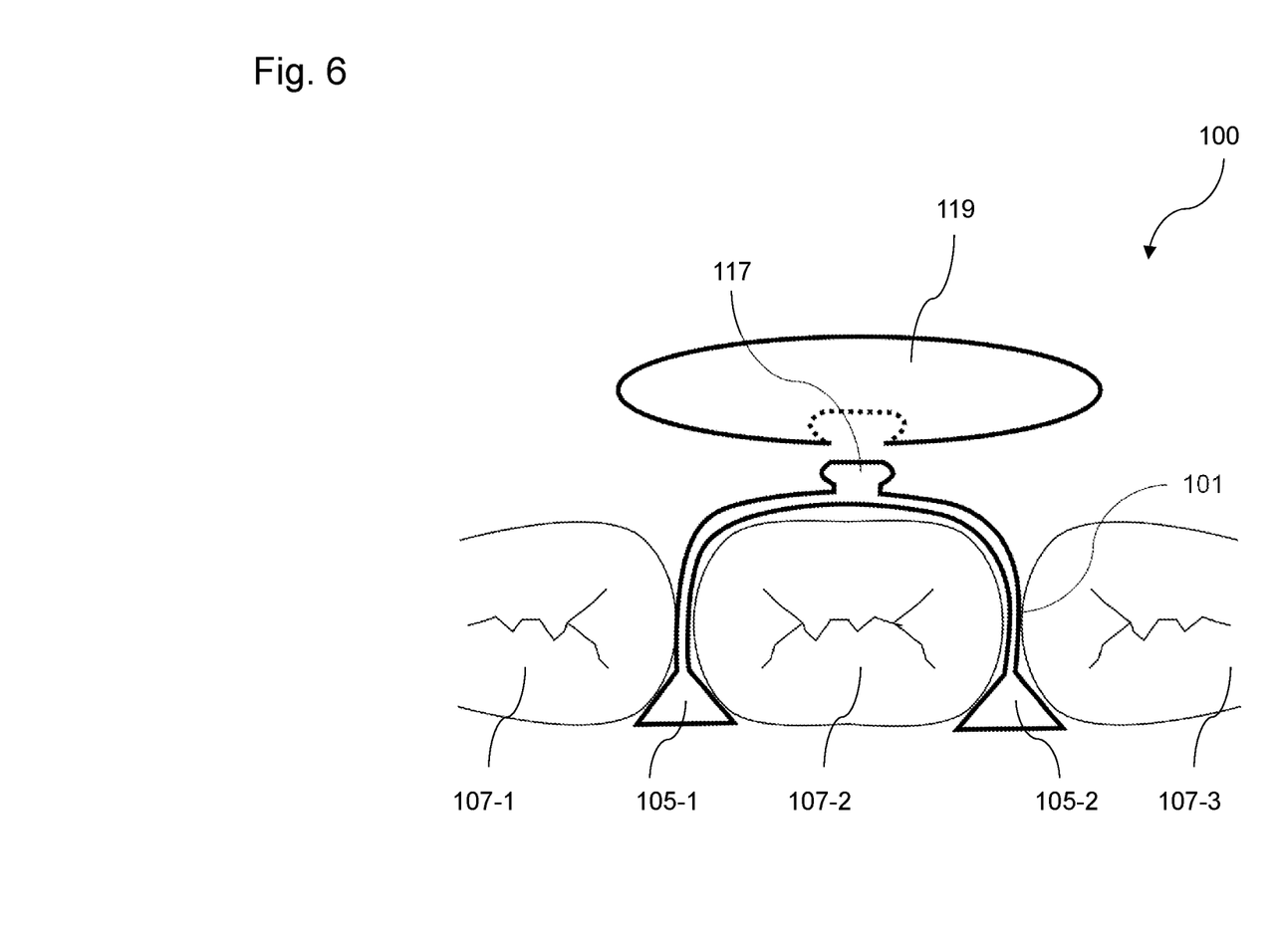
FIG. 6 a schematic view of another mounting system for a dental object in conjunction with a dental sensor.

FIG. 6 shows a schematic view of another fastening system 100 for a dental object in connection with a dental sensor 119. The band-shaped cross connector 101 with the wedge-shaped support elements 105-1 and 105-2 comprises a plug-in mechanism 117. The plug-in mechanism 117 forms a connecting element for the dental sensor 119, such as a nub for a push button. The plug-in mechanism 117 is used to allow the dental sensor 119 to be plugged in, threaded in, or otherwise attached.

The surfaces of the individual components can be made rough on the side that abuts tooth 107-1 and 107-2 so that they adhere better and do not slip off the smooth surface.

Figure 7:
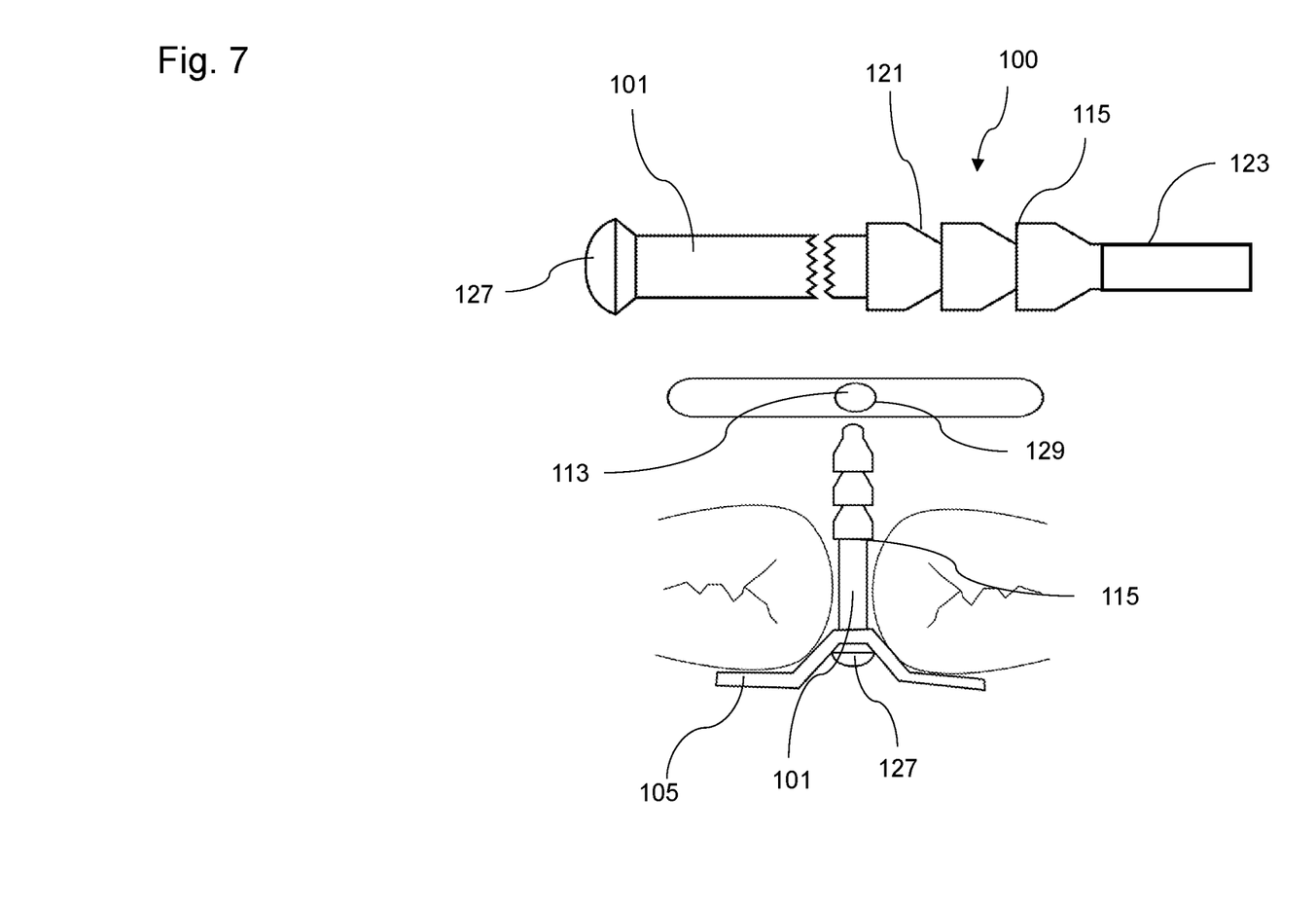
FIG. 7 an enlarged view of a further fastening system for a dental object.

FIG. 7 shows a magnified view of another fastening system 100 for a dental object. The transverse connector 101 is formed by a silicone pin which is pushed through the interdental space 103 and is fixed there. The silicone pin may be expandable and tenso-elastic, such that it is slenderized by expansion. This allows the silicone pin to be easily inserted into the interdental space 103, such as a dental floss.

The cylindrical silicone pin includes circumferential projecting support edges 115 that are slid into the opening 113 and against which the opening edge 129 of the opening 113 is supported. In this position, cross connector 101 is secured to support member 105. To facilitate insertion of the cross connector 101 into the opening 113, the cross connector 101 includes a tapered portion 121 over which the opening edge 129 slides onto the support edge 115.

In front of the tapered section 121, the cross connector 101 comprises a protruding threading section 123 for threading the cross connector 101 into the opening 113. The threading section 123 is sufficiently long and can be adjusted by shortening it after the cross connector 101 has been fastened. In addition, the cross connector 101 includes a laterally projecting head 127 through which tensile forces can be transmitted to the support member 105.

In this way, a fastening system 100 can be implemented according to the catch dowel principle, which enables fast and simple fastenings to both delicate and voluminous teeth 107-1, 107-2 and 107-3. The fastening system 100 avoids damage to the tooth structure, as retention forces can be set specifically.

The elastic silicone pin of the transverse connector 101 also protects against overloading. The risk of swallowing or aspiration of the fastening system 100 can be excluded. In addition, easy cleaning of covered areas is possible due to the flexible silicone pin.

Figure 8:
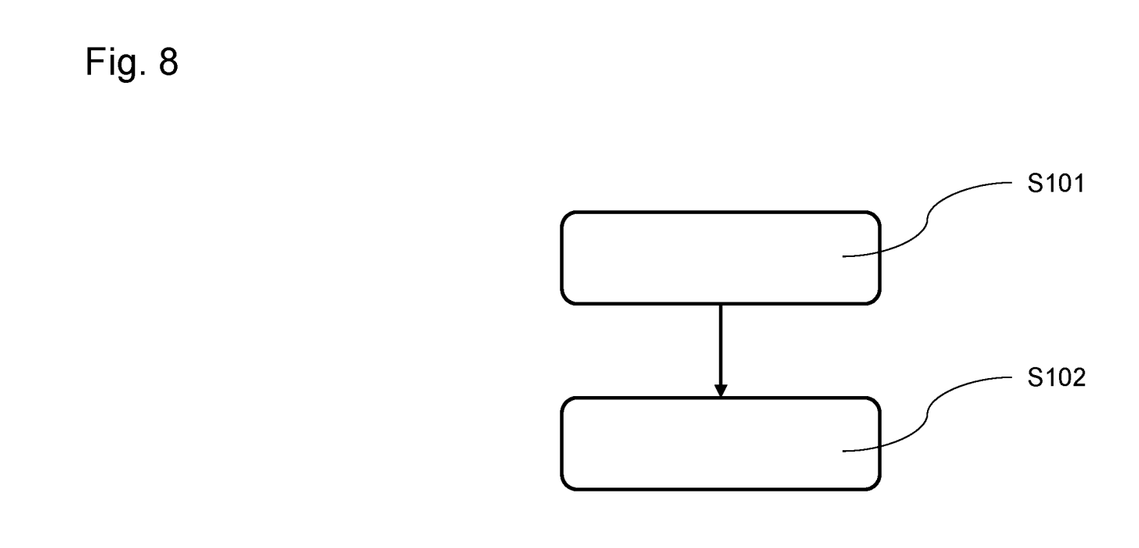
FIG. 8 a block diagram of a method for attaching a dental object.

FIG. 8 shows a block diagram of a method for attaching a dental object. In step 5101, the transverse connector 101 is passed through the interdental space 103. In step 5102, the transverse connector 101 is supported by the support member 105 for supporting on the teeth 107-1, 107-2 laterally of the interdental space 103.

In all places, cross-connector and transverse connector are interchangeable.

All features explained and shown in connection with individual embodiments of the invention may be provided in different combinations in the subject matter of the invention to simultaneously realize their beneficial effects.

All method steps can be implemented by devices which are suitable for executing the respective method step. All functions that are executed by the features in question can be a method step of a process.

The scope of protection of the present invention is given by the claims and is not limited by the features explained in the description or shown in the figures.

REFERENCE LIST

100 Mounting system
101 Cross element
103 Interdental space
105 Support element
107 Tooth
109 Sawtooth profile
111 Latching means
113 Opening
115 Support rim
117 Plug-in mechanism
119 Dental sensor 121 Conic section
123 Threading section
125 Slewing ring
127 Head
129 Opening edge
131 Channel
133 Passage opening
135 Channel

The invention claimed is:

1. A fastening system (100) for a dental object, comprising:
   a transverse connector (101) for passing through an interdental space (103); and
   two support elements (105) for supporting the transverse connector (101) on the teeth (107-1, 107-2) laterally of the interdental space (103),
   wherein the two support elements (105) are separate from the transverse connector (101) and comprise an opening (113) for passage of the transverse connector (101) to extend out of the support elements (105),
   wherein the support elements (105) are formed as plates, with a longest dimension of the plates extending in the mesial and distal directions, when assembled,
   wherein the two support elements (105) require the transverse connector (101) to extend through only a single interdental space for positioning on the teeth.

2. The fastening system (100) according to claim 1, wherein the transverse connector (101) comprises a sawtooth profile (109) or a thread for screwing on a nut.

3. The fastening system (100) according to claim 2, wherein the support elements (105) comprise a latching means (111) for engaging the sawtooth profile (109) of the transverse connector (101).

4. The fastening system (100) according to claim 1, wherein the transverse connector (101) is tenso-elastic and/or the transverse connector (101) is band-shaped or pin-shaped.

5. The fastening system (100) according to claim 1, wherein the transverse connector (101) and/or the support elements (105) are porous.

6. The fastening system (100) according to claim 1, wherein the dental object comprises a dental sensor and/or a sensor housing,
   wherein the transverse connector (101), the dental sensor (119) and/or the sensor housing comprises one or more channels.

7. The fastening system (100) according to claim 1, wherein the support elements (105) are elastic such that the support elements move into the interdental space (103) by a pull of the transverse connector (101).

8. A fastening system (100) for a dental object, comprising:
   a pin-shaped transverse connector (101) for passing through an interdental space (103); and
   two support elements (105) for supporting the transverse connector (101) on the teeth (107-1, 107-2) laterally of the interdental space (103), wherein the support elements (105) are formed as plates, with a longest dimension of the plates extending in the mesial and distal directions, when assembled,
   wherein the two support elements (105) require the transverse connector (101) to extend through only a single interdental space for positioning on the teeth.

9. A fastening system (100) for a dental object, comprising:
   a transverse connector (101) for passing through an interdental space (103); and
   two plate-shaped support elements (105) for supporting the transverse connector (101) on the teeth (107-1, 107-2) laterally of the interdental space (103), with a longest dimension of the plates extending in the mesial and distal directions, when assembled,
   wherein the two support elements (105) require the transverse connector (101) to extend through only a single interdental space for positioning on the teeth.

* * * * *